United States Patent
Benveniste

(10) Patent No.: US 7,860,054 B2
(45) Date of Patent: Dec. 28, 2010

(54) METHOD AND APPARATUS FOR USING SINGLE-RADIO NODES AND MULTI-RADIO NODES IN A NETWORK

(75) Inventor: Mathilde Benveniste, South Orange, NJ (US)

(73) Assignee: Avaya Inc., Basking Ridge, NJ (US)

(*) Notice: Subject to any disclaimer, the term of this patent is extended or adjusted under 35 U.S.C. 154(b) by 976 days.

(21) Appl. No.: 11/494,114

(22) Filed: Jul. 26, 2006

(65) Prior Publication Data

US 2007/0060168 A1 Mar. 15, 2007

Related U.S. Application Data

(60) Provisional application No. 60/702,282, filed on Jul. 26, 2005.

(51) Int. Cl.
*G01R 31/08* (2006.01)
*H04W 72/00* (2009.01)

(52) U.S. Cl. .......... 370/329; 455/450
(58) Field of Classification Search ......... 370/329; 455/450
See application file for complete search history.

(56) References Cited

U.S. PATENT DOCUMENTS

| 2003/0207696 A1* | 11/2003 | Willenegger et al. ........ 455/522 |
| 2005/0047359 A1* | 3/2005 | Sebire ........................ 370/312 |
| 2005/0058151 A1* | 3/2005 | Yeh ............................. 370/445 |

* cited by examiner

*Primary Examiner*—Ajit Patel
*Assistant Examiner*—Timothy Pham
(74) *Attorney, Agent, or Firm*—Chapin IP Law, LLC; David W. Rouille, Esq.

(57) ABSTRACT

A method, apparatus and computer program product for using a single-radio node and a multi-radio node in a wireless network having a control channel and at least one data channel is presented. One radio of the multi-radio node is kept tuned to the control channel. The single-radio node and the multi-radio node release the control channel at a predetermined time. Further, the data channels used by the single-radio nodes are released at the predetermined time. In such a manner single-radio and multi-radio nodes can co-exist harmoniously in wireless networks with increased bandwidth utilization and efficiency.

17 Claims, 9 Drawing Sheets

METHOD AND APPARATUS FOR USING SINGLE-RADIO NODES AND MULTI-RADIO NODES IN A NETWORK

CROSS REFERENCE TO RELATED APPLICATIONS

The present application claims the benefit of U.S. Provisional Patent Application No. 60/702,282, filed on Jul. 26, 2005, which is incorporated herein by reference.

BACKGROUND

Growth in demand for WLANs is driving the development of new technology to provide higher throughput. To a greater extent this growth is due to the increased number of users and applications desiring wireless transmission and to a lesser extent to the emergence of new applications needing higher transmission rates along a single connection between two points. The former requires higher aggregate throughput. The latter requires increased link throughput. This paper deals with a MAC based approach for increasing aggregate throughput of a wireless network (i.e. a WLAN or a wireless network) by enabling the simultaneous transmission on multiple channels.

The MAC protocol distinguishes between two logical channel functions, the Control Channel (CC) and the Data Channel (DC). Stations exchange control and management frames on the control channel. The data channels carry data traffic. Reservations for transmission on the various data channels are made by exchanging control frames on the control channel. This control channel is used by each node for time reservations on data channel(s) and for acknowledgements. The control channel does not change dynamically (fast).

Data channel(s) are the channels used by nodes to transmit data traffic. Each node may transmit always on the same data channel(s), or it may select a channel to transmit on demand (dynamic channel assignment).

As extensions of the legacy RTS and CTS messages, the CC-RTS and CC-CTS are used to reserve a data channel for the time it takes to transmit a Transmission Opportunity (TXOP). A TXOP (transmit opportunity) is a sequence of frames transmitted between a pair of nodes following a single contention for the channel. A Source node is the node initiating the TXOP, and the Destination node is the node receiving the TXOP. Data traffic can be transmitted only on a data channel that is idle. The particular data channel selected for transmission of the TXOP is indicated in a special field on the CC-RTS/CC-CTS.

A CC-RTS frame is the frame used by a node initiating a TXOP. A CC-CTS frame is used by a node accepting a TXOP. If acknowledgement of receipt of transmission is desired, it can be sent either on the data channel or on the control channel. An acknowledgement on the control channel, known as the CC-ACK, identifies the individual frame in a sequence of frames that were received successfully (similar to 802.11e Group Ack).

A node with frames to transmit to a neighbor sets its data radio to transmit on a permissible data channel, sends a CC-RTS on the control channel to the destination node, and waits for a CC-CTS, which contains the acceptance or denial of the channel reservation request for the selected/assigned data channel.

If the destination node receives the CC-RTS, it sends a CC-CTS. The CC-CTS will contain a zero in the Reservation Duration field if the destination node does not accept the reservation request in the CC-RTS. A CC-CTS is not sent if the Reservation Duration field or the Number of Frames field contains a zero in the CC-RTS.

If the destination node accepts the reservation request in the CC-RTS, the destination node sets a data radio to receive on the data channel assigned/selected by the source node. If the destination node receives the same CC-RTS in the SIFS plus tx time, it sends another CC-CTS and waits for a time interval equal to SIFS plus CC-CTS tx duration. If the CC-CTS has not arrived at the source node by the expiration of SIFS plus CC-RTS tx duration plus CC-CTS tx duration, it transmits within SIFS another CC-RTS on the control channel.

If the CC-CTS is received within a time interval comprising the SIFS plus the CC-RTS tx duration plus the CC-CTS tx duration by the source node, and the Reservation Duration field has a zero value, the source node sends a CC-RTS to the destination node with the Reservation Duration field set to zero. If the CC-CTS is received within a time interval equal to the SIFS plus the CC-RTS tx duration plus the CC-CTS tx duration by the source node, and the Reservation Duration field has been changed to a longer value, the source node sends a CC-RTS to the destination node with the Number of frames set to zero. If the CC-CTS has arrived within the time interval equal to the SIFS plus the CC-RTS tx duration plus the CC-CTS tx duration at the source node, and the Reservation Duration field has a non-zero value, the source node transmits the frame(s) in the TXOP.

Data can be transmitted only if the selected data channel is idle. The reservation process may start before the data channel becomes idle. Contention for the control channel and the transmission of a CC-RTS and CC-CTS can take place while the data channel is still busy. Traffic prioritization is more effective if data channel reservations are made right before the data channel becomes idle, as described in co-pending application Ser. No. 11/408,695 filed on Apr. 21, 2006 titled "Prioritized Access in a Multi-Channel MAC Protocol", the disclosure of which is incorporated by reference in it's entirety.

The CC-RTS/CC-CTS exchange may be defined so that it can reserve multiple data channels, or the control channel and one or more data channels, for the same time interval. The CCC protocol can be expanded to allow for several channels to be reserved at once for the communication between two nodes. For instance, the sending node may reserve a data channel and the control channel for the transmission data. The data may be split into two streams to be transmitted simultaneously to the destination node one two independent radios. This would double the data rate between two nodes. In this scenario, the node needs two radios. Alternatively, two data channels may be reserved at once by the transmitting node. The two channels may be adjacent and a single broader bandwidth radio would be used to transmit and receive. If the two channels are not adjacent, two independent data radios would each transmit a portion of the data.

Two multi-channel MAC protocols are examined. One protocol requires at least two radios per device: one radio, the 'control radio' is dedicated to the control channel, and the remaining radios, called 'data radios', are tuned to data channels. Whereas the control radio may be used for control and data traffic, only data traffic may be sent through the data radio(s). We refer to this protocol as the 'multi-radio protocol'. The nodes in a wireless network employing a multi-radio protocol are referred to as 'multi-radio nodes'.

The second protocol does not require a node to have a dedicated control radio. The same radio is switched between control and data channels. The nodes in a wireless network employing a single-radio protocol are referred to as 'single-radio nodes'.

When both single-radio and multi-radio nodes comprise a wireless network, referred to as a 'mixed network', additional measures are taken to allow for the co-existence of the two types of nodes.

With the multi-radio protocol, each node maintains a channel-specific NAV to avoid collisions. The NAV tracks the length of time for which a control or data channel is reserved. The NAV is the time period the node must refrain from transmitting on the channel, and is updated when a node receives a reservation request or a response to the reservation request. The NAV of a data channel is based on the value of the Reservation Duration field of the CC-RTS/CC-CTS. NAV-setting frames received on the data channels also update the data channel NAVs.

With a single-radio protocol, it is not possible to maintain NAV solely based on the NAV setting frames received on the control and data channels because there is no dedicated radio on the control channel. To make up for the lost NAV information, requirements to release all channels periodically force the NAV of all channels (either implicitly or explicitly) to be reset to zero. For the same reason, the control channel and any data channels shared by both single-radio and multi-radio nodes must be released periodically in a mixed network.

In a mixed network, multi-radio and single-radio nodes must co-exist in a way that enables both types of nodes to access channels.

SUMMARY

Conventional mechanisms such as those explained above suffer from a variety of deficiencies. One such deficiency is that conventional wireless networks which incorporate both single-radio nodes and multi-radio nodes can result in either inefficient use of the available bandwidth or require special synchronization techniques which tend to be complex and time consuming.

Embodiments of the invention significantly overcome such deficiencies and provide mechanisms and techniques that provide for increased bandwidth utilization and efficiency for networks incorporating single-radio nodes and multi-radio nodes.

In a particular embodiment of a method of using a network that includes a plurality of multi-radio nodes and/or single-radio nodes, and the network further includes a control channel and possibly data channels that are accessible by both the single-radio and multi-radio nodes. The method includes keeping one radio of the multi-radio node tuned to the control channel. The method includes releasing, by all nodes of the network, the control channel and any data channels accessible by the single-radio nodes at a predetermined time at a start of a period. The method further includes tuning, by all single-radio nodes of the network, to the control channel at a predetermined time at the start of a period.

Other embodiments include a computer readable medium having computer readable code thereon for using a network that includes a plurality of multi-radio nodes and/or single-radio nodes, and the network further includes a control channel and possibly data channels that are accessible by both the single-radio and multi-radio nodes. The computer readable medium includes instructions for keeping one radio of the multi-radio node tuned to the control channel. Additionally, the computer readable medium includes instructions for releasing, by all nodes of the network, the control channel and any data channels accessible by the single-radio nodes at a predetermined time at a start of a period. The computer readable medium further includes instructions for tuning, by all single-radio nodes of the network, to the control channel at a predetermined time at the start of a period.

Still other embodiments include a computerized device (either a single-radio node or a multi-radio node), configured to process all the method operations disclosed herein as embodiments of the invention. In such embodiments, the computerized device includes a memory system, a processor, communications interface in an interconnection mechanism connecting these components. The memory system is encoded with a process that provides using a single-radio node and a multi-radio node in a wireless network as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for using a single-radio node and a multi-radio node in a network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya Inc. of Lincroft, N.J.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
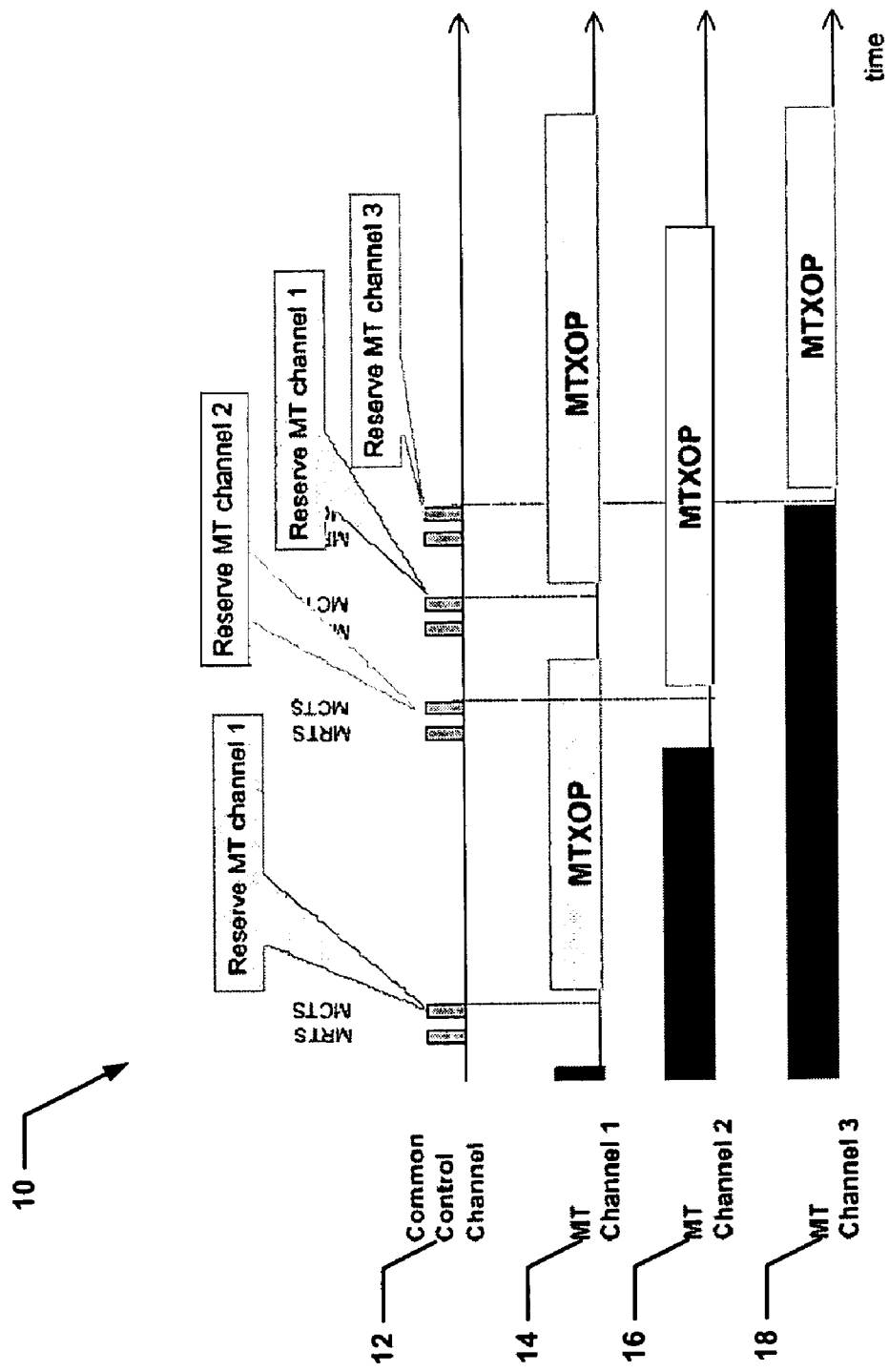
FIG. 1 comprises a diagram showing data channel usage in accordance with embodiments of the present invention.

Two multi-channel MAC protocols are examined. One protocol requires at least two radios per device: one radio, the 'control radio', is dedicated to the control channel, and the remaining radios, called 'data radios', are tuned to data channels. We refer to this protocol as the 'multi-radio protocol'. The nodes in a wireless network employing a multi-radio protocol are referred to as 'multi-radio nodes'.

The second protocol does not require a node to have a dedicated control radio. The same radio is switched between control and data channels. The nodes in a wireless network employing a single-radio protocol are referred to as 'single-radio nodes'.

When both single-radio and multi-radio nodes comprise a wireless network, referred to as a 'mixed network', additional measures are taken to allow for the co-existence of the two types of nodes.

In a mixed network, multi-radio and single-radio nodes must co-exist in a way that enables both types of nodes to access channels.

The multi-radio protocol, known as Common Control Channel (CCC) protocol, is a MAC protocol that extends the IEEE 802.11 distributed MAC protocol to enable use of multiple channels within a WLAN BSS or a wireless mesh network. The CCC protocol defines a flexible channel access architecture based on distributed prioritized contention-based medium access. The CCC protocol distinguishes between two logical channel functions, the Control Channel (CC) and the Data Channel (DC), also referred to as the Network Traffic (data channel). Nodes exchange control and management frames on the control channel. The data channels carry data traffic.

A control radio is needed per node for the control channel. This radio will monitor the control channel to establish whether its data channel is reserved/busy and for acknowledgement of received transmissions. Data radio(s) are used by a node for data traffic. The data radio will be set to transmit on the node's data channel when the node is sending traffic to a neighbor node. This radio will be set to receive on a node neighbor's data channel when the node is receiving traffic to the neighbor node. Even when a single data channel is assigned per node, multiple data radios per node will enable it to receive data traffic from multiple neighbors simultaneously, and thus enhance performance.

A node with multiple data radios may transmit and receive traffic on different data channels simultaneously. A node need not keep all radios powered in order to be able to receive transmissions destined to it. It is sufficient to keep only the radio tuned to the control channel powered, where notice of all transmissions directed to the node will arrive. This way, the proposed MMAC protocol helps preserve battery life in multi-radio battery-powered nodes, which under a different protocol might need to keep all radios powered. If non-CCC compliant nodes are using the same channels, however, it is advisable to keep the data radios powered in order to receive NAV-setting frames, which helps maintain accurately the busy/idle status of such channels.

In order to reserve a channel for transmission, a pair of forwarding and destination nodes reserves a data channel for a data transmission. Both nodes maintain a record of the channel availability in NAVs specific to each of the data channels. The reservation procedure involves the exchange of a CC-CC-RTS/CC-CC-CTS pair on the control channel. FIG. 1 illustrates the reservation of three data channels using the control channel. NAV-setting frames received on the data channels also update the data channel NAVs.

The single-radio nodes are able to use different physical channels for data traffic while receiving notification of transmission on the control channel. It is not possible, however, to maintain a NAV solely based on the NAV-setting frames received on the control channel because there is no dedicated radio on the channel. To make up for the lost NAV information, requirements to release all channels periodically force the NAV of all channels (either implicitly or explicitly) to be reset to zero. NAVs for all channels used by single-radio nodes must be cleared at designated times in order to enable nodes that moved away from the control channel in order to transmit on a different channel, to update their NAVs. The following requirements are imposed on access and timing of transmissions.

Global channel release is required at a known time in order to force all channel NAVs to be reset to a known value, namely zero. This requirement is imposed on all nodes using data channels that are accessed by single-radio nodes, including multi-radio nodes. It is met through the use of MTBTTs (multi-channel target beacon transmission times) spaced a period P apart, just like TBTT in the 802.11-1999 standard. A single-radio node must tune to the control channel at each MTBTT, and monitor the NAVs until it is able to secure a reservation by exchanging CC-RTS/CC-CTS with the receiving node of a pending TXOP.

Another requirement, imposed only on nodes that do not track the control channel constantly, is that such a node may be involved in a single reservation in the time interval between two consecutive MTBTTs. Multi-radio nodes may make reservations for as many TXOPs as possible before relinquishing the channel at MTBTT.

Finally, to enable all nodes that don't monitor the control channel constantly to receive network signaling and other multicast data, they are required to stay tuned to the control channel for the same time interval, the Control Segment (CS). A node may contend to transmit a CC-RTS during CS, but it may not retune to the data channel to transmit a TXOP until the end of CS. That means that reservations secured before the end of CS must have the time till the end of CS added to the Duration value on the CC-RTS. The CS must be longer than the time required for a reservation exchange.

Once the Control Segment is over and it is assessed that a TXOP reservation is accepted, a single-radio node tunes its radio to the reserved data channel and transmits a TXOP. After completing the TXOP transmission, the node will retune to the control channel in order to listen for transmissions destined to it. A node may transmit additional traffic before MTBTT on the control channel only. At MTBTT all nodes will be tuned to the control channel, and with NAVs reset to 0, the reservation procedure will start again.

Unlike in a network that consists of multi-radio nodes exclusively, including single-radio nodes imposes synchronization requirements on the multi-radio nodes. In the absence of nodes that don't monitor the control channel constantly, a node would not need to relinquish its data channel at MTBTT.

In a mixed network, a multi-radio node may keep a radio always tuned to the control channel in order to monitor the NAVs of all channels and to make a reservation for a selected data channel from the permissible set. The CC-RTS used to reserve a data channel accessible by single-radio nodes will set the Reservation Duration field so that a TXOP terminates by the next MTBTT.

There are no restrictions limiting the number of TXOPs transmitted/received per MTBTT cycle for a multi-radio node. In contrast to a single-radio node, the multi-radio node will continue the reservation procedure until it must refrain from transmitting on the control channel at MTBTT. Immediately thereafter it will resume reservation and transmission of network traffic.

Clearly, a multi-radio node uses the data channels more efficiently. Such a node can transmit/receive multiple TXOPs on a data channel per MTBTT cycle, and can transmit/receive on a data channel during the Control Segment. Thus, what might appear as inefficient use of the data channels by single-radio nodes is remedied by the presence of multi-radios nodes, which can occupy the data channels fully, including when they would be otherwise left sitting idle.

FIG. 1 illustrates the concept of a Control Channel (CC) and Data Channels (DCs) as well as the basic channel access mechanism. In the illustrated example 10, the nodes have access to three data channels (14, 16, and 18) and a control channel 12. Reservation of a data channel may commence shortly before the data channel becomes idle. The time when this occurs is discerned from the NAV for that channel, maintained by each node. DC 14 is the first channel to be reserved, shortly before it becomes idle. Two reservations are secured subsequently on DC 16 and DC 14 right as the two channels become available. DC 18, which is busy in the meanwhile, does not have a reservation waiting when it becomes available. DC 18 will sit idle until a frame/TXOP arrives. Both the forwarding and receiving node maintain a channel state vector [Channel-State=0 indicates that the data channel is idle] or a NAV for each usable channel. A node monitors the control channel and keeps track of all reservations made by other nodes to determine the busy/idle status of data channels, and when they will become available. The Reservation Duration field on the CC-RTS/CC-CTS is used to update the NAV for the channel reserved. The CC-RTS/CC-CTS Reservation Duration field is different from the Duration/ID field in the MAC header of the CC-RTS/CC-CTS frames. The latter indicates the length of the CC-RTS/CC-CTS transmission on the control channel. A reservation request is declined if the receiving node deems the requested channel busy, or if all its radios are busy.

The busy/idle status and/or the NAV timer is also updated from NAV-setting requests heard over the data radio. NAV updates from the data radio become important if the wireless network co-exists with independent WLAN users. If data channels are assigned dynamically, NAV synchronization can be achieved with greater certainty by tuning a radio to the selected data channel as early as possible and no later than the generation of a CC-RTS or CC-CTS reserving that channel.

The data channel reserved for the transmission of a TXOP is selected from among a set of "permissible" channels maintained by a node. The reservation exchange may start while the data channel is busy, but the data channel must be idle when the reservation process is completed. Advance reservation of the data channel is not permitted in order to ensure proper prioritization of data traffic. That is, higher-priority frames will be transmitted before lower-priority frames that may have arrived earlier.

The receiving node responds with a CC-CTS within a time interval of length SIFS. A CC-CTS is sent to indicate acceptance of a channel reservation request. The Reservation Duration field is copied in the CC-CTS sent by the receiving node. If a CC-CTS is not received, the forwarding node assumes that the reservation request is declined. A reservation is accepted if the data channel indicated in the CC-RTS will become idle within a pre-specified time interval, according to the NAV maintained by the receiving node and if the receiving node has available radios to receive the transmission. Successful receipt of a data traffic transmission is followed by an acknowledgement sent either on the data channel according to EDCA rules or as a group acknowledgment on the control channel.

Nodes are aware of the busy/idle status of all channels through the control radio, which monitors both the activity on that channel and the reservations for data channels. To prevent loss of that information, the assignment of a physical channel to the control radio is generally static (that is, it changes infrequently, and only if it becomes necessary). In contrast, the physical channel assignments of data radio(s) can be dynamic. This flexibility enables a node to use any of several data channels based on availability, thus allowing better overall channel utilization. To be able to monitor the control channel and transmit on a data channel, it is sufficient for a node to be equipped either with two receivers and one transmitter, or with two full radios. In the former case, the transmitter must be retuned from the control channel to the data channel before transmitting data.

Figure 2:
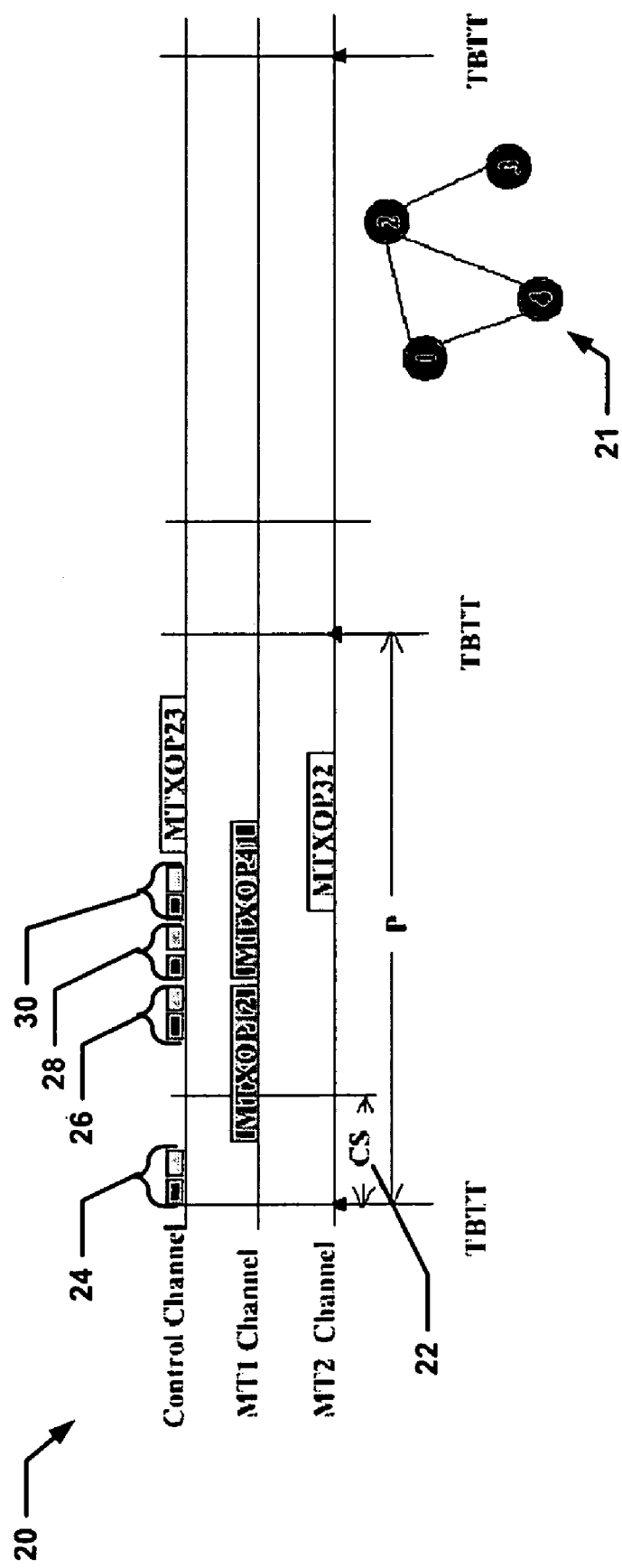
FIG. 2 comprises a diagram showing control channel and data channel usage wherein all nodes are multi-radio nodes in accordance with embodiments of the present invention.
Figure 3:
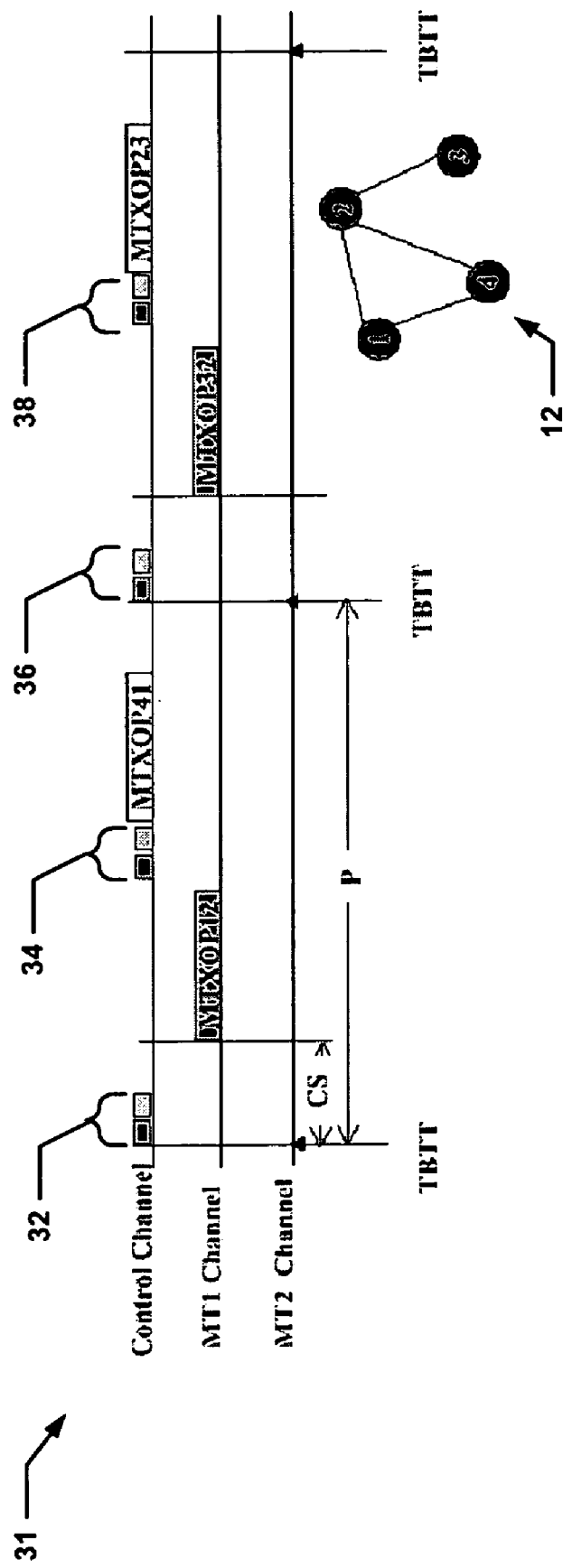
FIG. 3 comprises a diagram showing control channel and data channel usage wherein all nodes are single-radio nodes in accordance with embodiments of the present invention.
Figure 4:
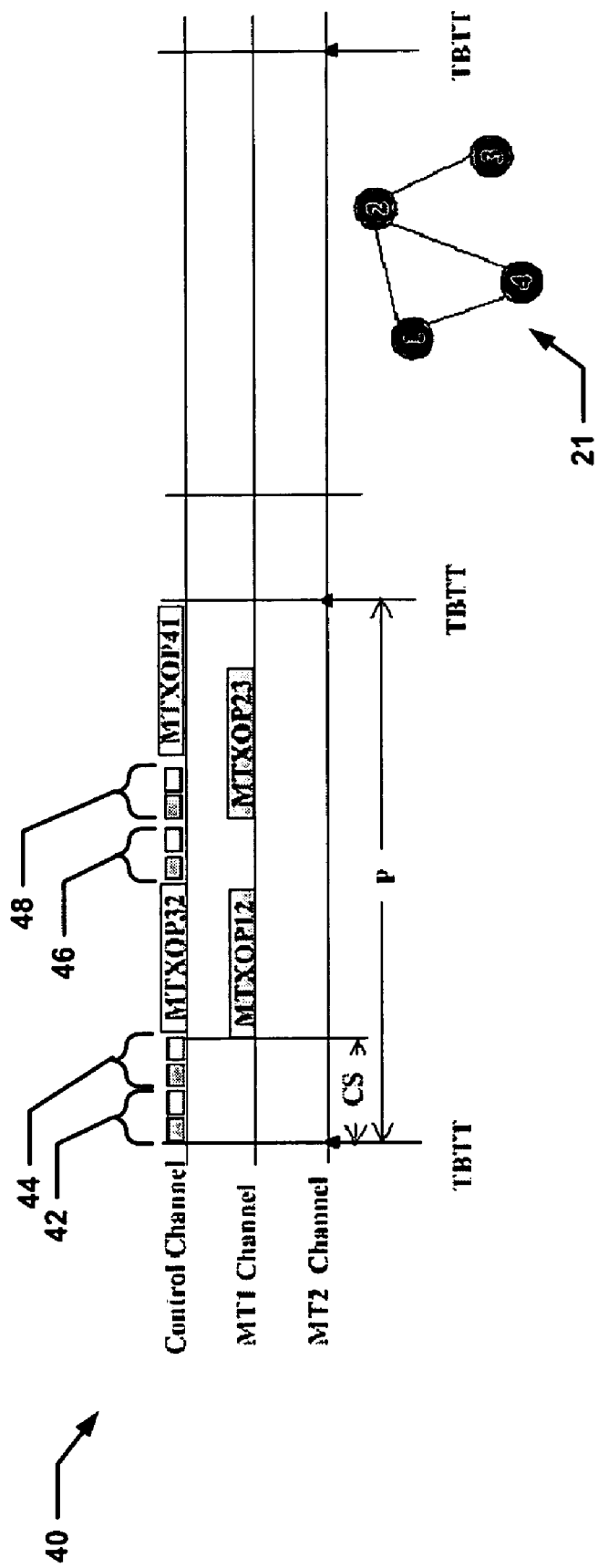
FIG. 4 comprises a diagram showing control channel and data channel usage wherein all nodes are single-radio nodes except for one node, which is a multi-radio node in accordance with embodiments of the present invention.

FIGS. 2, 3 and 4 illustrate the utilization of data channels with multi-radio nodes, single-radio nodes, and both types present. A network of four nodes is considered, as illustrated, with the following TXOPs pending transmission: MTXOP12, MTXOP41, MTXOP32, and MTXOP23. In FIG. 2, all nodes have two radios, one of which is constantly tuned to the control channel. In FIG. 3, all nodes have one radio, which changes between the control channel and an data channel. A second data channel is available but cannot be used due to the constraints of the protocol. In FIG. 3, node2 has two radios, one tuned to the control channel. All other nodes have a single radio.

Referring now to FIG. 2, a timing diagram 20 shows the transmission of data and signaling for a control channel and two data channels (MT1 and MT2) for a mesh 21. Mesh 21 includes four nodes. Node 1 is in communication with nodes 2 and 4, node 2 is in communication with nodes 1 and 4, node 3 is in communication with node 2, and node 4 is in communication with nodes 1 and 2. Each node (1-4) has at least two radios, with one radio always tuned to the Control Channel. Also shown are target beacon transmission times (TBTT)

spaced a period (P) apart. At the TBTT time a Control Segment (CS) 22 is shown. Global channel release is performed at TBTT in order to force all channel NAVs to be reset to a known value, namely zero.

A reservation, comprising an CC-RTS/CC-CTS 12 is shown on the control channel during the CS. Once it is assessed that a TXOP reservation is accepted, a node tunes its radio to the reserved data channel and transmits a TXOP. Thus, nodes 1 and 2 tune to data channel 1 for MTXOP12. A second CC-RTS/CC-CTS 26 reservation takes place prior to the MTXOP12 completing, and also reserves data channel 1 for the MTXOP41 which begins soon after MTXOP12 finishes. A third reservation 28 takes place and reserves data channel 2. Transmission of MTXOP32 begins on data Channel 2, while MTXOP41 is still ongoing on data Channel 1. Another reservation 30 takes place and reserves the Control Channel for TXOP. MTXOP23 begins on the control channel and is ongoing while MTXOP41 finishes and while MTXOP32 finishes.

A node may keep a radio that is always tuned to the control channel in order to monitor the NAVs of all channels and to make a reservation for a selected data channel from the permissible set. A CC-RTS will be transmitted provided the TXOP terminates by the next MTBTT. The node will continue the reservation procedure until it must refrain from transmitting at MTBTT. Immediately thereafter it will resume reservation and transmission of network traffic.

Referring now to FIG. 3, a timing diagram 31 shows the transmission of data and signaling for a control channel and two data channels (MT1 and MT2) for the same network 21 as shown in FIG. 2. In this example, all nodes have a single radio, which switches between the control channel and the data channels.

A single-radio node may tune to the control channel at each MTBTT, and monitor the NAVs until it is able to secure a reservation by exchanging CC-RTS/CC-CTS with the receiving node of a pending TXOP. All such nodes stay tuned to the control channel for the duration of the Control Segment in order to receive any network signaling information and multicast data. A node may contend to transmit a CC-RTS during CS, but it may not retune to the data channel to transmit a TXOP until the end of CS. That means that reservations secured before the end of CS must have the time till the end of CS added to the Duration value on the CC-RTS. The CS must be longer than the time required for a reservation exchange.

Once the Control Segment is over and it is assessed that a TXOP reservation is accepted, a node tunes its radio to the reserved data channel and transmits a TXOP. After completing the TXOP transmission, the node will re-tune to the control channel in order to listen for transmissions destined to it. A node may transmit additional traffic before MTBTT on the control channel only. At MTBTT all nodes will be tuned to the control channel, and with NAVs reset to 0, the reservation procedure will start again.

A reservation, comprising an CC-RTS/CC-CTS 32 is shown on the control channel during the CS. Once it is assessed that a TXOP reservation is accepted, a node tunes its radio to the reserved data channel and transmits a TXOP. Thus, nodes 1 and 2 tune to data channel 1 for TXOP12. Each node (1 and 2) switches its radio from the control channel to data channel 1. A second CC-RTS/CC-CTS 34 reservation takes place after the TXOP 12 completes, and reserves the control channel for the TXOP41 which begins soon thereafter. A third reservation 36 takes place at the next period during the CS for that period. This reservation request reserves data channel 1. Transmission of MTXOP32 begins on data Channel 1, after the CS is complete. Another reservation 38 takes place and reserves the Control Channel for TXOP. MTXOP23 begins on the control channel and finished before the end of the period.

Referring now to FIG. 4 a timing diagram 40 shows the transmission of data and signaling for a control channel and two data channels (MT1 and MT2) for the same network 21 as shown in FIG. 2. In this example, all nodes have a single radio which switches between the control channel and the data channels except for node 2 which has multiple radios, one if which is tuned to the control channel.

A single-radio node may tune to the control channel at each MTBTT, and monitor its activity until it is able to secure a reservation by exchanging CC-RTS/CC-CTS with the receiving node of a pending TXOP. All such nodes stay tuned to the control channel for the duration of the Control Segment (CS) in order to receive any network signaling information and multicast data. A node may contend to transmit a CC-RTS during CS, but it may not retune to the data channel to transmit a TXOP until the end of CS. Once the Control Segment is over and it is assessed that a TXOP reservation is accepted, a node tunes its radio to the reserved data channel and transmits a TXOP. After completing the TXOP transmission, the node will re-tune to the control channel in order to listen for transmissions destined to it or possibly attempt another transmission.

At MTBTT all nodes will be tuned to the control channel, and with NAVs reset to zero, the reservation procedure will start again. A node may keep a radio that is always tuned to the control channel in order to monitor the NAVs of all channels and to make a reservation for a selected data channel from the permissible set. A CC-RTS will be transmitted provided the TXOP terminates by the next MTBTT. The node will continue the reservation procedure until it must refrain from transmitting at MTBTT. Immediately thereafter it will resume reservation and transmission of network traffic.

A reservation, comprising a CC-RTS/CC-CTS 42 is shown on the control channel during the CS, as is a second reservation 44. After the CS completes, a TXOP reservation is accepted, a node tunes its radio to the reserved data channel and transmits a TXOP. Thus, nodes 1 and 2 tune to data channel 1 for TXOP 12. Each node (1 and 2) switches its radio from the control channel to data channel 1. The A second CC-RTS/CC-CTS 44 reservation results in TXOP32 taking place on the control channel. A third reservation 46 takes place reserving data channel 1. Transmission of TXOP23 begins on data Channel 1, after the reservation request 46. Another reservation 48 takes place and reserves the Control Channel for TXOP41. TXOP41 begins on the control channel and finished before the end of the period.

As described above and shown in the figures, a multi-radio node uses the data channels more efficiently as there are no restrictions limiting the number of TXOPs transmitted/received per MTBTT cycle. Such a node can transmit/receive multiple TXOPs on a data channel per MTBTT cycle, and can transmit/receive on a data channel during the Control Segment. Thus, what might appear as inefficient use of the data channels by single-radio nodes is remedied by the presence of multi-radios nodes, which can occupy the data channels fully, including when they would be otherwise left sitting idle. The delay in completing all transmissions is shortest in the case illustrated in FIG. 2. The longest delay is experienced when all nodes have a single radio, as seen in FIG. 3.

Figure 5:
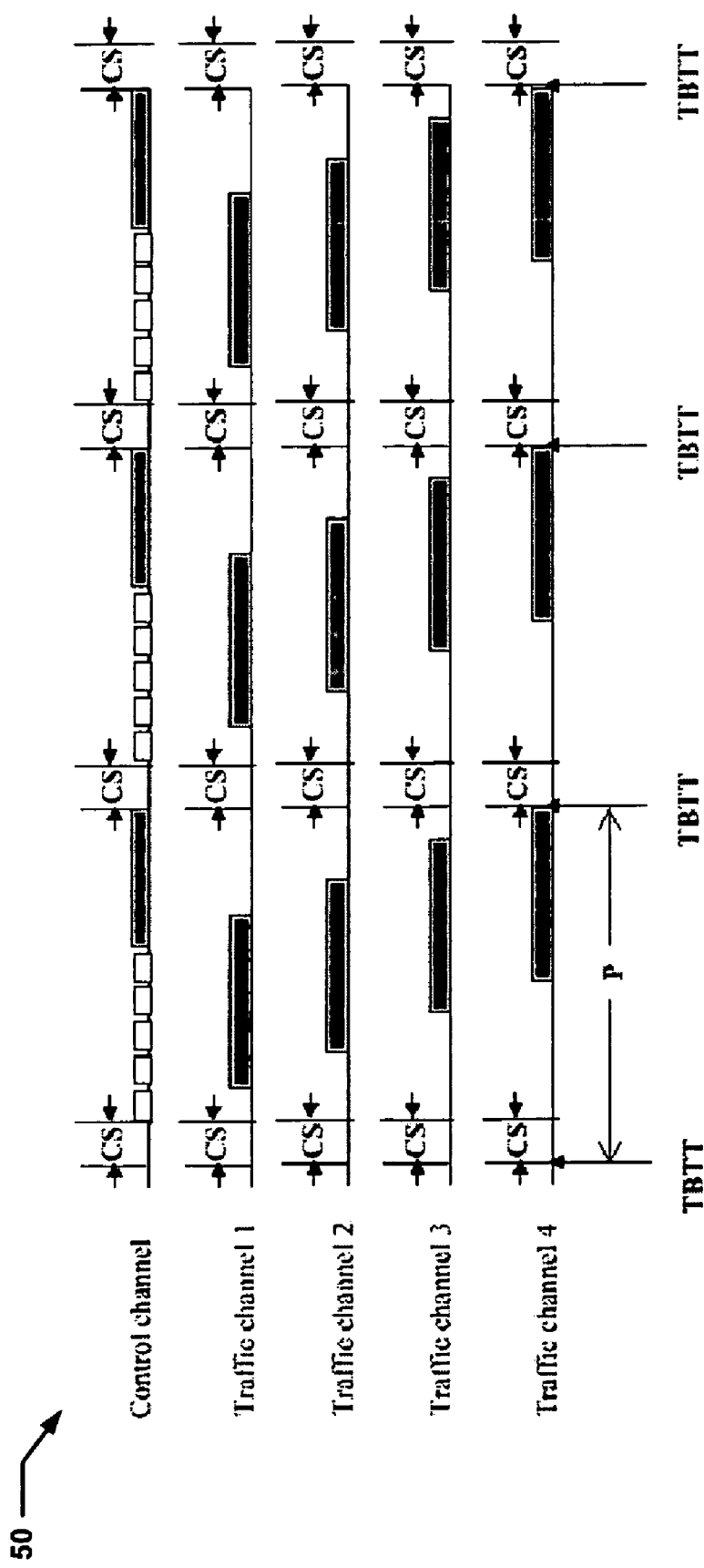
FIG. 5 comprises a diagram showing control channel and data channel usage wherein all nodes are single-radio nodes in accordance with embodiments of the present invention.
Figure 6:
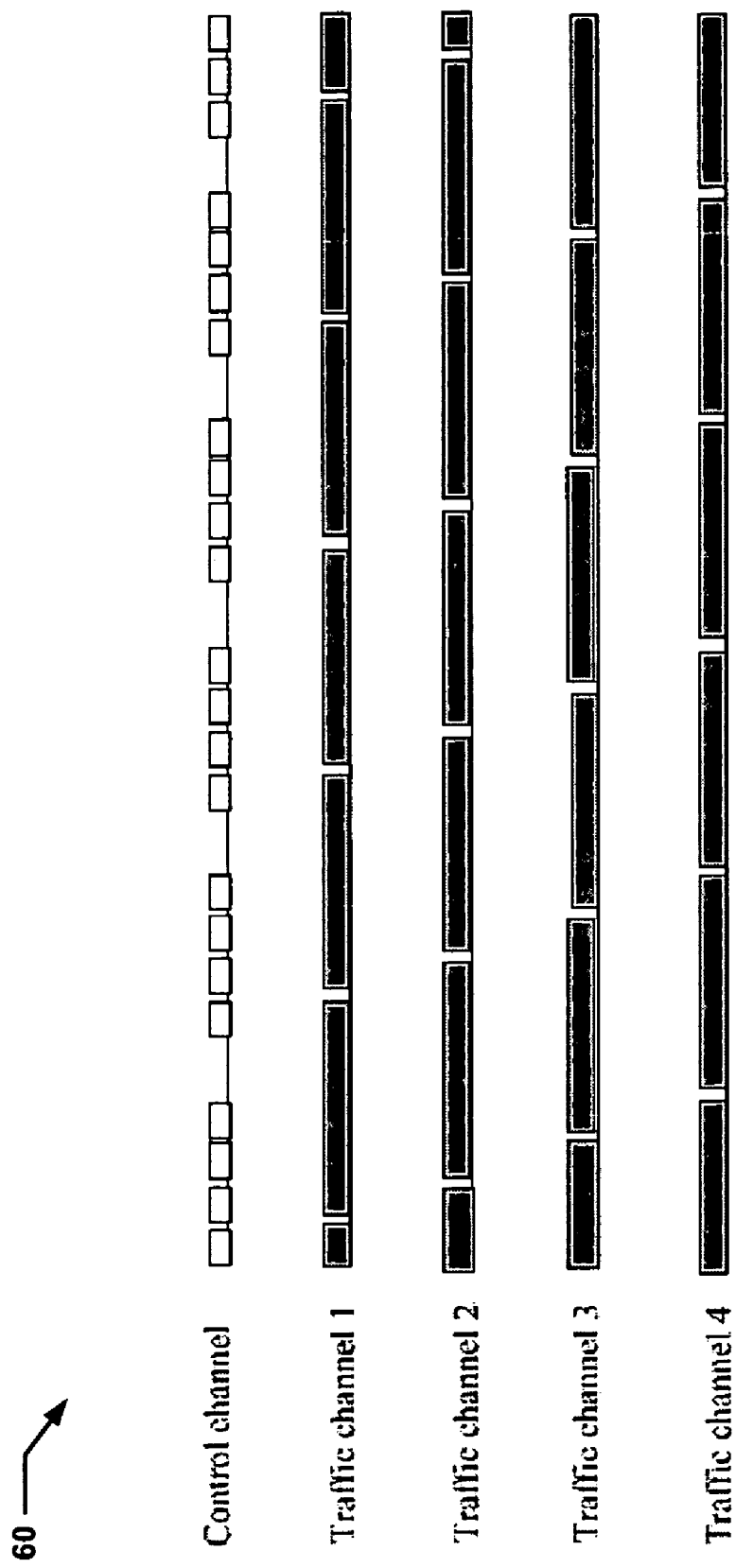
FIG. 6 comprises a diagram showing control channel and data channel usage wherein all nodes are multi-radio nodes in accordance with embodiments of the present invention.

The single-radio nodes that use data channels for network traffic leave blocks of unused channel time because of the limitation on the number of TXOPs per node per cycle, as illustrated in the timing diagram 50 of FIG. 5. Unable to assess the value of the channels' NAVs, a single-radio node that either received or transmitted a TXOP will either stay idle or transmit on the control channel. In the absence of multi-radio nodes, which are able to make multiple TXOP transmissions per node in a cycle, the data channels are not used as efficiently by single-radio nodes. The throughput will be thus lower. FIG. 6 illustrates a timing diagram 60 showing the utilization of the channels when a combination of single-radio and multi-radio nodes are present.

Having a single-radio for all nodes in a network leads to excessive delay end-to-end, as a single radio prevents a node that has received a TXOP from transmitting it before the next MTBTT, unless of course the control channel is available for transmission. A single radio node may have to wait for a whole cycle to reserve a data channel and transmit the TXOP to the next hop. This causes a delay of roughly period P to accrue at each hop. In a network with an average number of hops equal to 5, forwarding traffic along single-radio nodes would probably result in a delay too long to render a network appropriate for VoIP traffic and other QoS-sensitive applications. This underscores the important of using multi-radio nodes through most of the network, except perhaps at the network edges.

Figure 7:
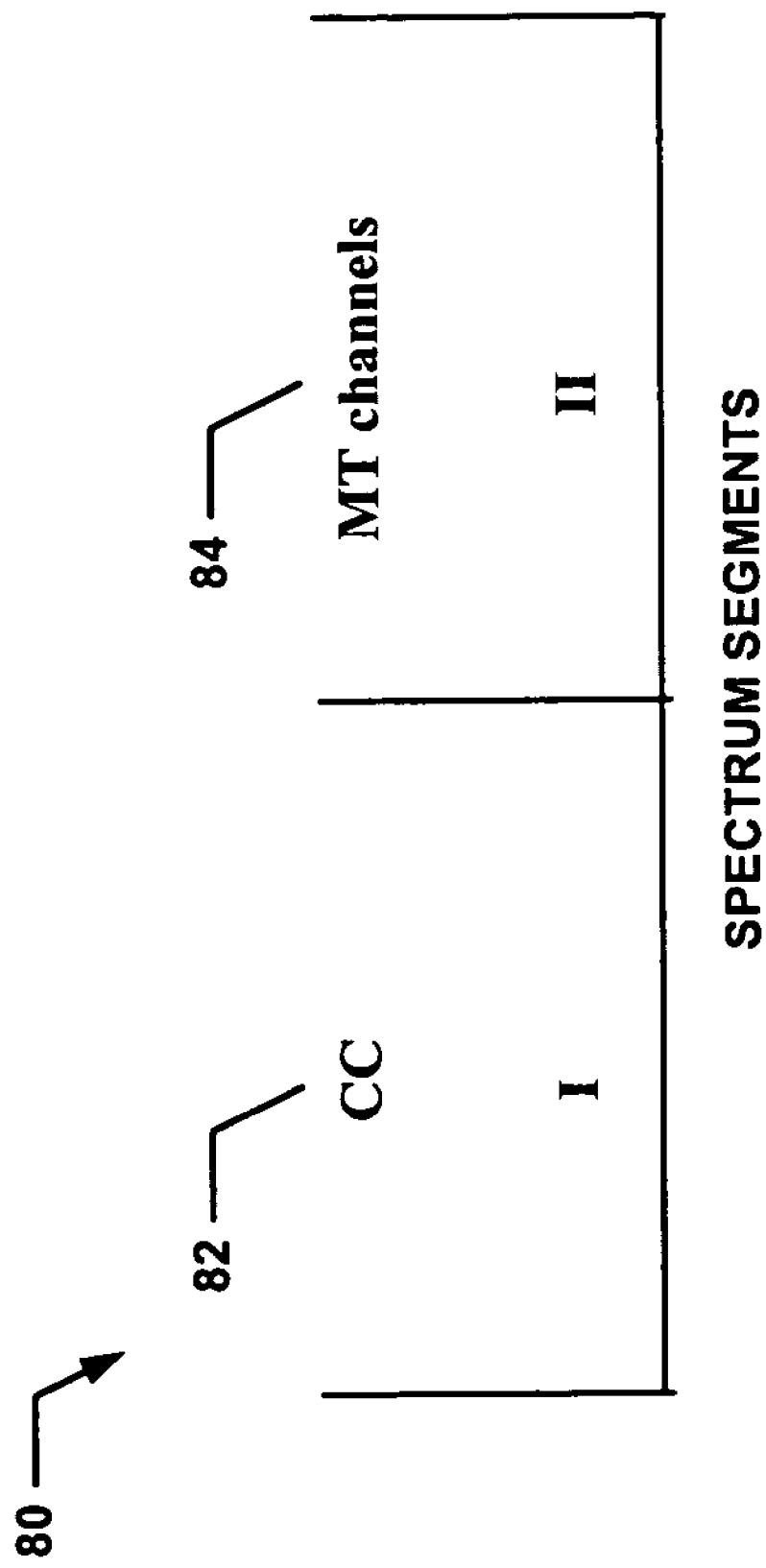
FIG. 7 is a diagram showing spectrum separation between a control channel and one or more data channels.

As discussed above, the single-radio and multi-radio node protocols can be used together in the same network, all sharing a common control channel on which multicast data and network signaling traffic can reach all nodes quickly. The available physical channels 80 are partitioned into two segments: A and B, as shown in FIG. 7. Segment A 82 comprises the data channels used by the single-radio nodes and the common control channel. Segment B 84 comprises the data channels used by the multi-radio nodes. Multi-radio nodes may access data channels in Segment A. For instance, Segment A could be the 2.4 GHtz band, and Segment B could be the 5 GHtz band. By separating the control channel from the data channels of multi-radio nodes, one can avoid adjacent channel interference that would have made it impossible for the control and traffic radios to operate concurrently (one transmitting and the other receiving).

All multi-radio nodes keep a radio tuned to the control channel all the time. Since the control channel is used also by the single-radio nodes, they must all release the control channel at the regular designated times, MTBTT. Finally, the data channels used by single-radio nodes, that is the data channels in Segment A, must be released at each MTBTT.

A flow chart of the presently disclosed method is depicted in FIGS. 8A and 8B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 8:
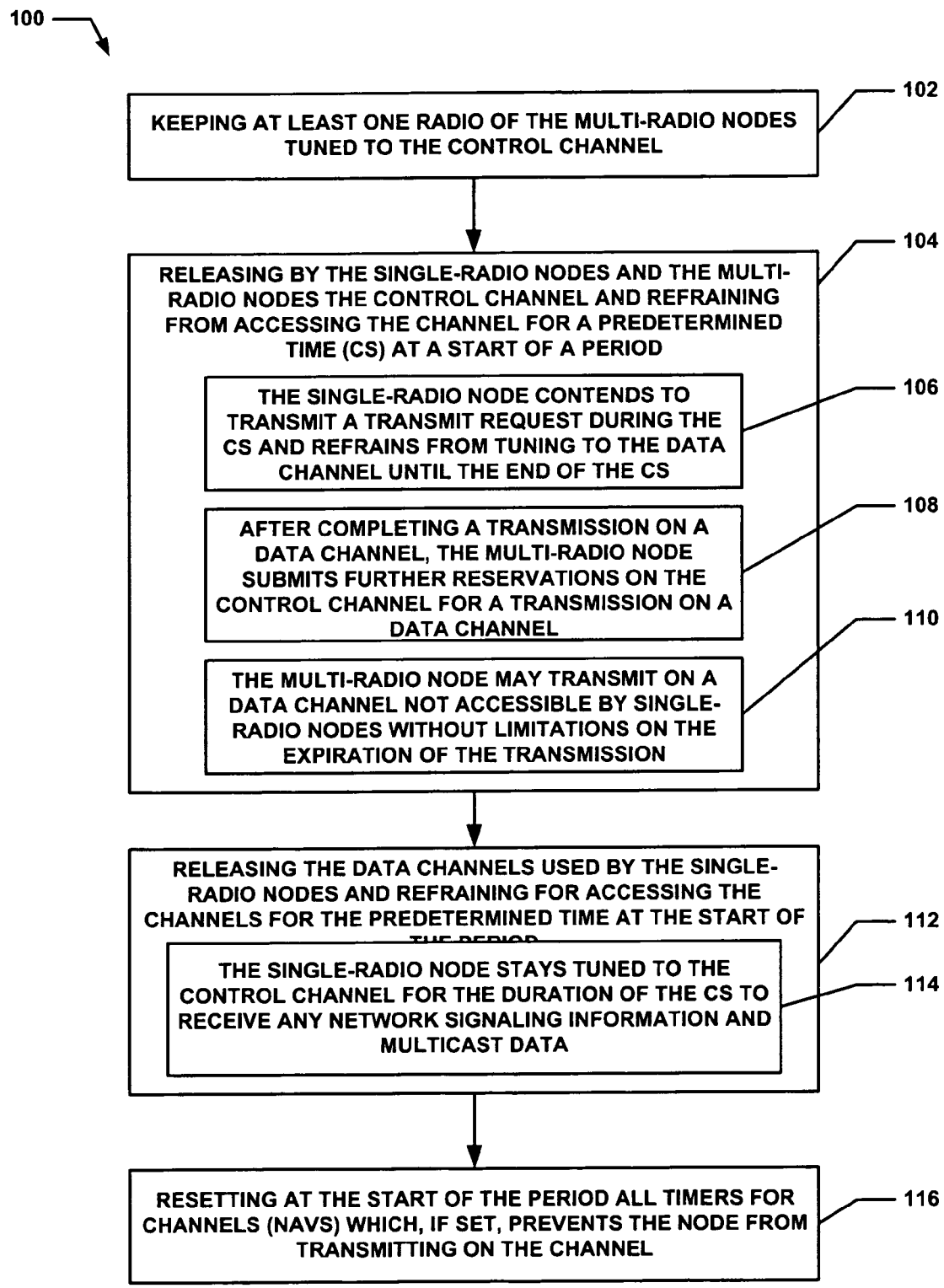
FIG. 8 illustrates a flow diagram of a particular embodiment of a method for using single-radio nodes and multi-radio nodes in a network in accordance with embodiments of the invention.

Referring now to FIG. 8 a method 100 of using a single-radio node and a multi-radio node in a network having a control channel and at least one data channel is shown. The method 100 begins with processing block 102 which discloses keeping at least one radio of the multi-radio node tuned to the control channel. The other radios of the multi-radio node are tuned to data channels.

Processing block 104 states releasing by the single-radio node and the multi-radio node the control channel and refraining from accessing the channel for a predetermined time at a start of a period. The predetermined time comprises a Control Segment (CS). The control segment begins at the beginning of a period, at the start point MBTT. Processing block 106 discloses the single-radio node contends to transmit a transmit request during the CS and refrains from tuning to the data channel until the end of the CS. Processing block 108 states after completing a transmission on a data channel, the multi-radio node submits further reservations on the control channel for a transmission on a data channel. Processing block 110 recites the multi-radio node may transmit on a data channel not accessible by single-radio nodes without limitations on the expiration of the transmission.

Processing continues with processing block 112 which discloses releasing the at least one data channel used by the single-radio node for the predetermined time at the start of the period. Processing block 114 states the single-radio node stays tuned to the control channel for the duration of the CS to receive any network signaling information and multicast data.

Processing block 118 recites resetting at the start of the period all timers for channels (NAVs) which, if set, prevents the node from transmitting on the channel.

By way of the above described method and apparatus increased bandwidth utilization and efficiency are provided for networks incorporating single-radio nodes and multi-radio nodes.

Figure 9:
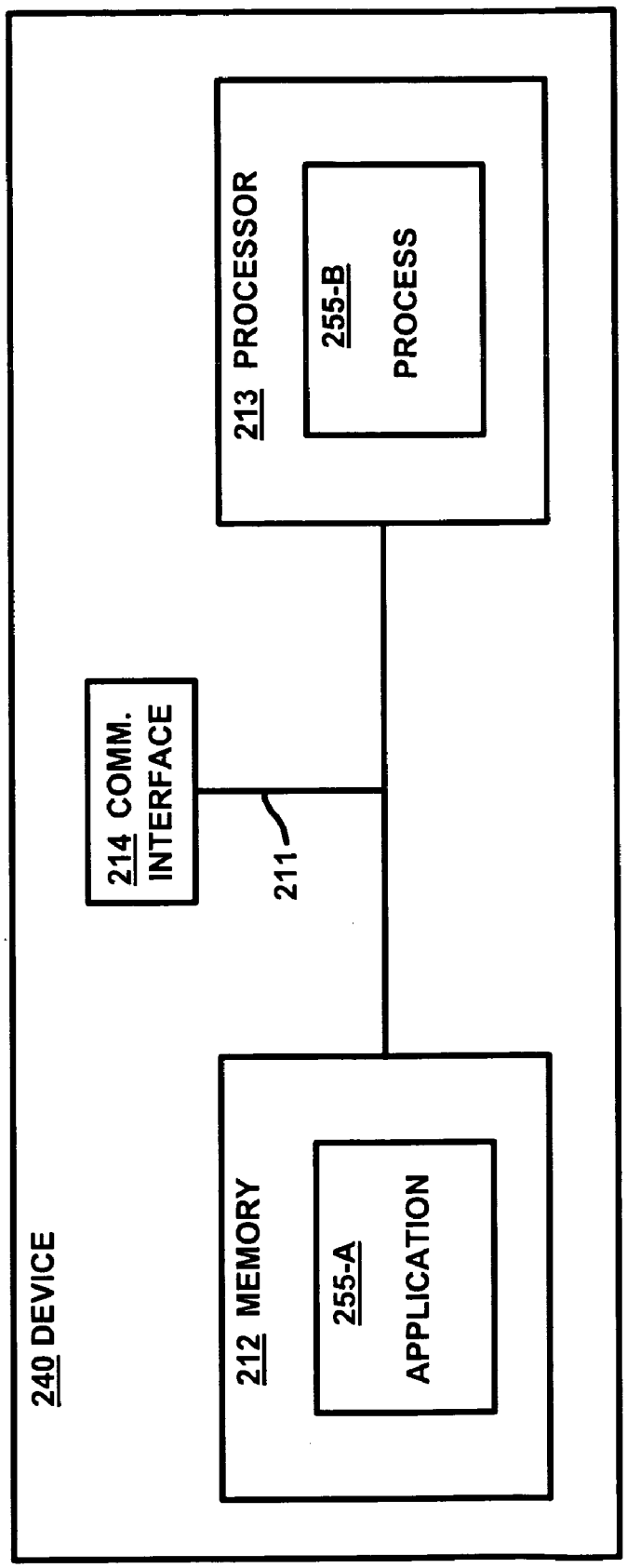
FIG. 9 illustrates an example computer system architecture for a node in accordance with embodiments of the invention.

FIG. 9 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 5 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of using single-radio nodes and multi-radio nodes in a network having a control channel and at least one data channel, the method comprising:
   keeping at least one radio of said multi-radio nodes tuned to the control channel;
   releasing by said single-radio nodes and said multi-radio nodes the control channel and refraining from accessing said control channel for a predetermined time (CS) at a start of a period; and
   releasing the data channels used by the single-radio nodes and refraining from accessing said data channels for said predetermined time at the start of the period, wherein said single-radio nodes receive network signaling data and multicast data during said CS, wherein said period starts after a global channel release which forces all channel Network Access Vectors (NAVs) to be reset to a value of zero and wherein a data channel Network Access Vector (NAV) is a time period a node must refrain from transmitting on said data channel and wherein a control channel Network Access Vector (NAV) is a time period a node must refrain from transmitting on said control channel.

2. The method of claim 1 wherein said single-radio node stays tuned to the control channel for the duration of the CS to receive any network signaling information and multicast data.

3. The method of claim 1 wherein said single-radio node contends to transmit a transmit request during said CS and refrains from tuning to the data channel until the end of said CS.

4. The method of claim 3 wherein after completing a transmission on a data channel, the multi-radio node submits further reservations on the control channel for a transmission on a data channel.

5. The method of claim 4 wherein said multi-radio node may transmit on a data channel not accessible by single-radio nodes without limitations on the expiration of the transmission.

6. The method of claim 1 further comprising reserving for the same time interval a group of multiple channels, the group of multiple channels comprising either multiple data channels, or a control channel and at least one data channel.

7. A non-transitory computer readable storage medium having computer readable code thereon for using a single-radio node and a multi-radio node in a network having a control channel and at least one data channel, the medium comprising:
   instructions for keeping at least one radio of said multi-radio node tuned to the control channel;
   instructions for releasing by said single-radio node and said multi-radio node the control channel and refraining from accessing said control channel for a predetermined time (CS) at a start of a period; and
   instructions for releasing the data channels used by the single-radio nodes and refraining from accessing said data channels for said predetermined time at the start of the period, wherein said single-radio nodes receive network signaling data and multicast data during said CS, wherein said period starts after a global channel release which forces all channel Network Access Vectors (NAVs) to be reset to a value of zero and wherein a data channel Network Access Vector (NAV) is a time period a node must refrain from transmitting on said data channel and wherein a control channel Network Access Vector (NAV) is a time period a node must refrain from transmitting on said control channel.

8. The computer readable medium of claim 7 further comprising instructions wherein said single-radio node stays tuned to the control channel for the duration of the CS to receive any network signaling information and multicast data.

9. The computer readable medium of claim 7 further comprising instructions wherein said single-radio node contends to transmit a transmit request during said CS and refrains from tuning to the data channel until the end of said CS.

10. The computer readable medium of claim 7 further comprising instructions wherein after completing a transmission on a data channel, the multi-radio node submits further reservations on the control channel for a transmission on a data channel.

11. The computer readable medium of claim 10 further comprising instructions wherein said multi-radio node may transmit on a data channel not accessible by single-radio nodes without limitations on the expiration of the transmission.

12. The computer readable medium of claim 7 further comprising instructions for reserving for the same time interval a group of multiple channels, the group of multiple channels comprising either multiple data channels, or a control channel and at least one data channel.

13. A single-radio node comprising:
   a memory;
   a processor;
   a communications interface;
   an interconnection mechanism coupling the memory, the processor and the communications interface; and
   wherein the memory is encoded with an application using a single-radio node in a network having a control channel and at least one data channel that when performed on the processor, provides a process for processing information, the process causing the single-radio node to be capable of performing the operations of:

releasing by said single-radio node the control channel and refraining from accessing said control channel for a predetermined time (CS) at a start of a period; and releasing the data channels used by the single-radio nodes and refraining from accessing said data channels for said predetermined time at the start of the period, wherein said single-radio nodes receive network signaling data and multicast data during said CS, wherein said period starts after a global channel release which forces all channel Network Access Vectors (NAVs) to be reset to a value of zero and wherein a data channel Network Access Vector (NAV) is a time period a node must refrain from transmitting on said data channel and wherein a control channel Network Access Vector (NAV) is a time period a node must refrain from transmitting on said control channel.

14. The single-radio node of claim 13 wherein said single-radio node stays tuned to the control channel for the duration of the CS to receive any network signaling information and multicast data.

15. The single-radio node of claim 13 wherein said single-radio node contends to transmit a transmit request during said CS and refrains from tuning to the data channel until the end of said CS.

16. The single-radio node of claim 15 wherein after completing a transmission on a data channel, the single-radio node retunes to the control channel.

17. The single-radio node of claim 16 wherein said single-radio node may transmit additional traffic during the period on the control channel only.

* * * * *